United States Patent [19]

Haushalter et al.

[11] Patent Number: 4,480,165
[45] Date of Patent: Oct. 30, 1984

[54] BRAZE FIXTURE AND METHOD OF USING

[75] Inventors: Frederick W. Haushalter, Kenton; Stanley J. Coughlin, Findlay; Khalid Pervaiz, Marion, all of Ohio

[73] Assignee: United Aircraft Products, Inc., Dayton, Ohio

[21] Appl. No.: 326,561

[22] Filed: Dec. 2, 1981

[51] Int. Cl.³ .............................................. B23K 1/04
[52] U.S. Cl. ............................ 219/85 R; 219/85 BM; 219/158; 228/183
[58] Field of Search .............. 219/85 R, 85 BM, 85 E, 219/85 D, 85 G, 85 M, 161, 158; 228/183; 29/157.3 B, 157.3 A, 157.3 R; 165/153

[56] References Cited

U.S. PATENT DOCUMENTS

| | | | |
|---|---|---|---|
| 1,899,080 | 2/1933 | Dalgliesh | 165/153 |
| 2,684,425 | 7/1954 | Vickland | 29/157.3 R X |
| 3,589,440 | 6/1971 | Friedrich | 165/153 |
| 3,726,466 | 4/1973 | Vedder et al. | 29/157.3 R X |
| 4,159,034 | 6/1979 | Bellovary et al. | 228/183 X |

Primary Examiner—Roy N. Envall, Jr.
Assistant Examiner—Catherine M. Sigda
Attorney, Agent, or Firm—J. E. Beringer

[57] ABSTRACT

A holding fixture for use in the brazing of heat exchangers applying multiple holding pressures, two of which are in senses opposed to one another. Cage members mount a heat exchanger between them and are biased in a separating sense. At the same time they incorporate apparatus to apply a clamping pressure essentially within respective cage members. Fixture mechanism includes a detachable part useful as a reactant member in application of the clamping pressure and as a dynamic retainer in applying a pressure in conjunction with a separating motion of the cage members. The invention has method aspects related to brazing in the presence of multiple applied pressures.

4 Claims, 10 Drawing Figures

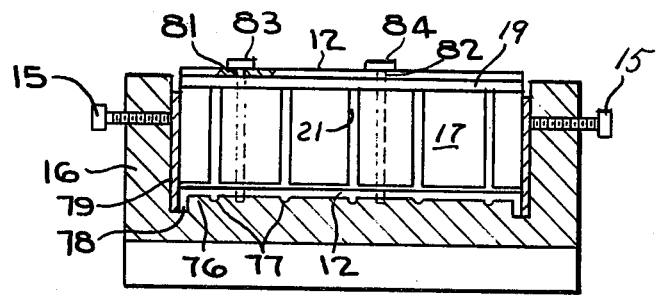
FIG-4
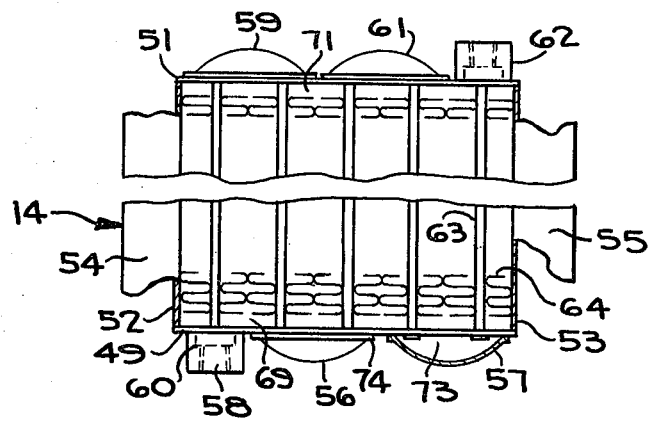
FIG-5
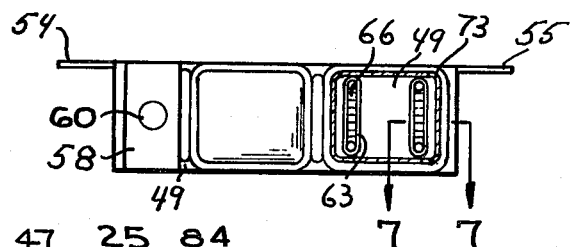
FIG-6
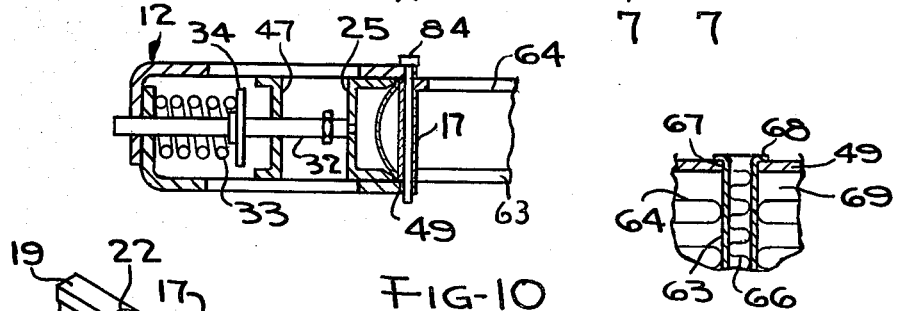
FIG-10
FIG-7
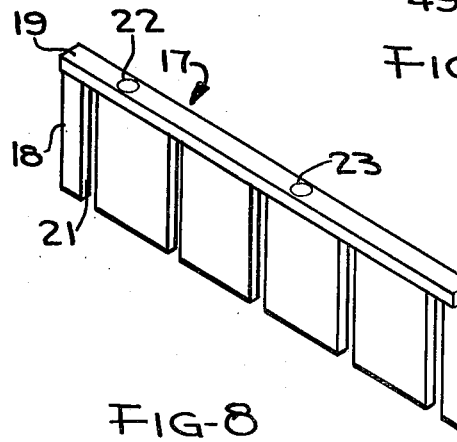
FIG-8
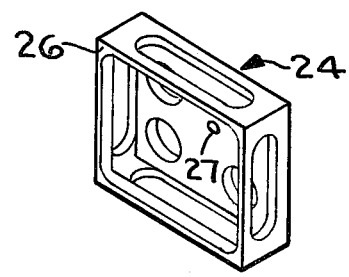
FIG-9

BRAZE FIXTURE AND METHOD OF USING

BACKGROUND OF THE INVENTION

1. Field of the Invention

This invention relates to a braze fixture and method of using, and has particular reference to the making of an all-brazed heat exchanger of a tube and header type.

2. Description of the Prior Art

Heat exchangers, especially those of compact, high performance design using fin material as a secondary heat transfer surface, are comprised of numerous parts some of which have a thin, light-weight construction. Manufacturing techniques have been developed according to which parts are formed, assembled, and the assembled unit placed into a holding fixture, and, while so held, subjected to a brazing operation, as for example by being heated in a furnace until applied braze alloy or braze material melts and flows to form a seal and a bond at all assembly joints. In a single operation, therefore, the heat exchanger parts are joined together by means acting not only as a seal and as a bond but also as a means promoting good heat transfer between the parts. In addition, joints are secure against damaging effects of temperature extremes and vibration.

As held in the braze fixture, it is important that parts defining the numerous joints be made to contact one another with a constant, uniformly applied pressure during a brazing cycle. Weakly brazed or unbrazed joints can lead to failure of a unit in use or at least to below specification performance. One result of this requirement is that it is usually attempted to braze together in a single operation only core elements of the heat exchanger, with external features such as manifold members and in-out fittings added in a separate operation or operations. In particular, and since the fixturing would involve the simultaneous application of opposing pressures, there has been no attempt, to our knowledge, to braze manifold members to a header plate while at the same time the header plate is brazed to turned over tube ends.

SUMMARY OF THE INVENTION

The instant invention has in view a braze fixture and method of use thereof in which multiple pressures are applied, including pressures in opposing senses. A mounting plate has a pair of relatively opposed cage members superposing thereon between which a heat exchanger is received. The heat exchanger is of a type in which spaced apart header plates are interconnected by tubes, the ends of which are turned over after being projected through plate apertures. Strip fin material positions between the tubes, and is in contact with tube exteriors. Manifold members and in-out fittings are applied to header plate outer walls. The cage members are biased in a separating relation to one another and each includes a detachable part engaged over a respective header plate to pressure the plate into contact with turned over tubes ends. At the same time, such part serves as a reactant means in conjunction with other biasing means in each cage member to pressure manifold and fitting members into contact with a plate outer wall. On the mounting plate is a structure to apply a lateral pressure to the assembly of tubes and fin material intermediately of the header plates so that the fin material will be pressured into contact with adjacent tubes. The several described pressures are applied and maintained within the fixture, and the mounted fixture then brazed, as in a furnace.

An object of the invention is to provide a braze fixture and method of using substantially as in the foregoing.

Other objects and details of the fixture structure and method will more clearly appear from the description to follow, when read in connection with the accompanying drawings, wherein:

FIG. 4 is a view in cross section through the fixture mounting plate, looking toward an inner end of a cage member, the heat exchanger being omitted;

FIG. 5 is a fragmentary top plan view of a heat exchanger of a kind brazed according to the present fixture and method;

FIG. 6 is an end view of the heat exchanger of FIG. 5, a manifold member being broken away to show tube ends, FIG. 7 is a detail view in cross section, taken substantially along line 7—7 of FIG. 6;

FIG. 8 is a detail view in perspective of a part comprised in the braze fixture having aspects of both a reactant and dynamic means therein;

FIG. 9 is a detail view in perspective of a pressure applying part comprised in the braze fixture; and FIG. 10 is a detail view in cross section, taken substantially along the line 10—10 of FIG. 2.

Figure 1:
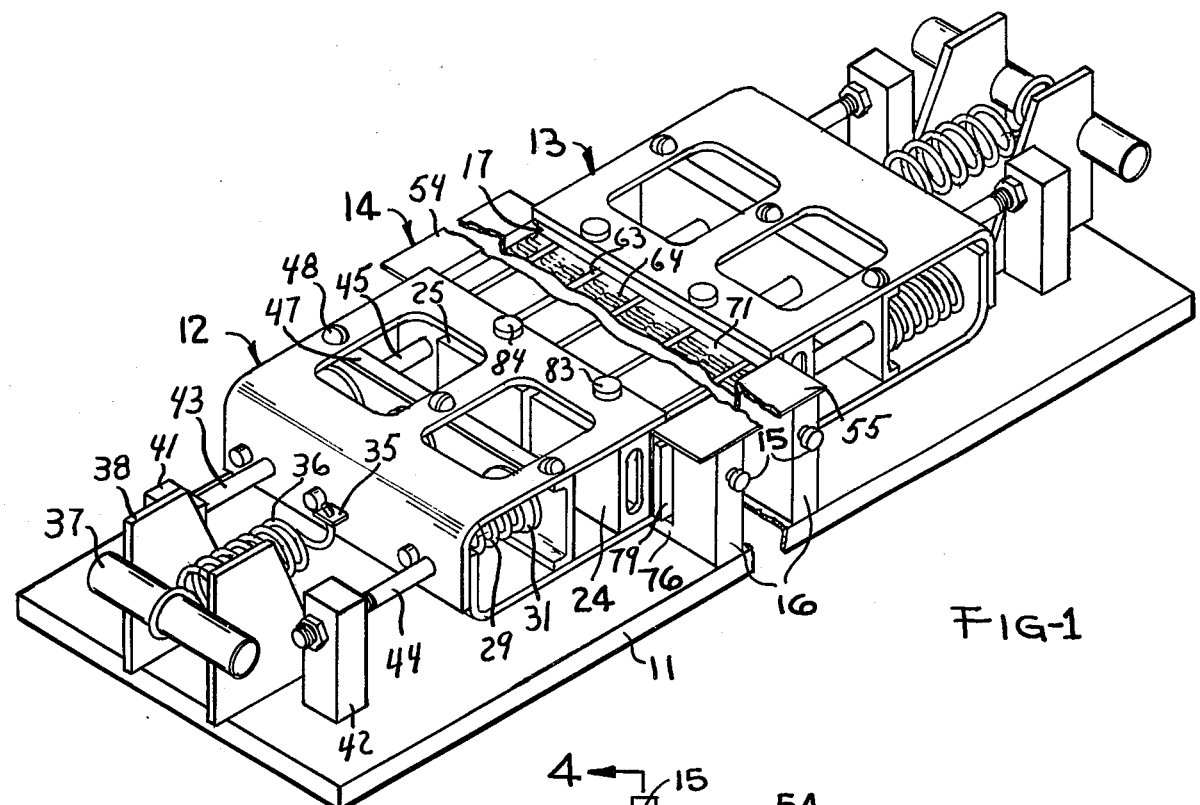
FIG. 1 is a view in perspective of a braze fixture in accordance with the illustrated embodiment of the invention, shown holding a heat exchanger for brazing, a portion of the heat exchanger intermediate its ends being omitted from the drawing.
Figure 2:
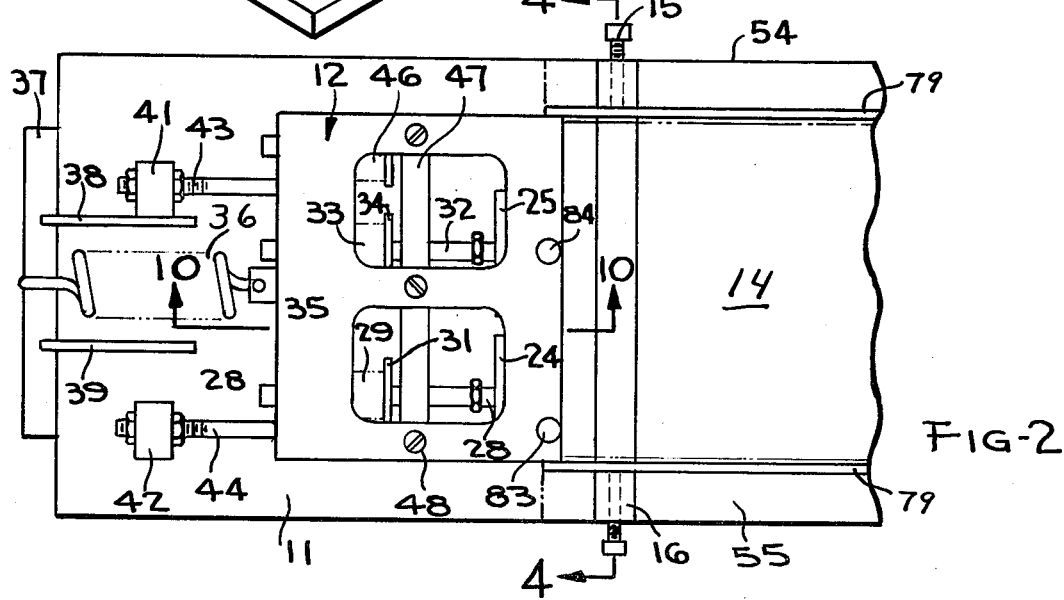
FIG. 2 is a top plan view of the braze fixture, showing one end only thereof.
Figure 3:
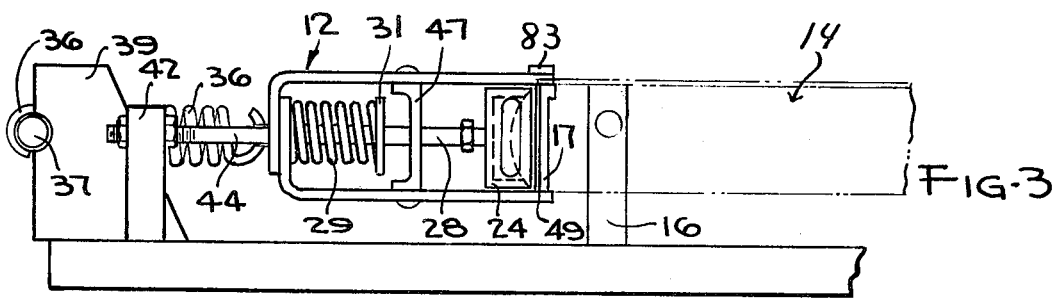
FIG. 3 is a view in side elevation of the braze fixture portion shown in FIG. 2.

Referring to the drawings, a braze fixture according to the illustrated embodiment of the invention comprises a base or mounting plate 11 over which positions a pair of cage members 12 and 13. A heat exchanger 14 is received between the cage members, which, as seen, are identically constructed U-shaped members orienting to have their open ends in an opposed, facing relation to one another. In a manner which will hereinafter more clearly appear, ends of the heat exchanger are gripped and held by opposing cage members and relatively oppositely directed endwise pressures applied while the entire apparatus including the fixture and held heat exchanger is heated in a furnace to accomplish brazing of heat exchanger parts one to another. In addition, laterally directed pressures are applied within the heat exchanger core area through adjustable screw studs 15 mounted in arms 16 upstanding from an upper surface of the base plate 11.

The cage members 12 and 13, and associated parts at each end of the mounting plate 11, are the same so that a description of that part of the braze fixture at one end of the mounting plate will suffice for both ends. Thus, and considering cage member 12, a part 17 is in a vertically positioning generally closing relation to the open end thereof. The part 17 is comprised of a rectangular plate portion 18, an upper edge of which is turned over as a flange 19. In the plate portion 18, and opening through the lower edge thereof, is a plurality of spaced apart vertical slots 21. A pair of vertical passages 22 and 23 extend through the plate portion 18 and through flange 19.

Inwardly of part 17, and having a substantially floating mounting within cage 12, is a pair of pressure applying members 24, and 25 in a side by side, independently movable relation to one another. The members 24 and 25 have a box-like configuration, one side of each thereof being open and defining a peripheral pressure applying surface 26 (FIG. 9). Each member is, moreover, apertured for uniformity of heat flow and in a side opposite the open side has a small diameter opening 27. Rod 28 has a reduced diameter tip portion at one end engaged in opening 27 in member 24 and extending perpendicularly thereof to have its opposite end received in a through aperture in the closed end of cage 12. A compression spring 29 surrounds rod 28 and is interposed between a fixed disc 31 thereon and the closed end of the cage. The spring force accordingly is applied in a direction to urge rod 28 axially or in a direction to press member 24 toward the open end of the cage or toward part 17. Pressure applying member 24 is capable of tilting, self adjusting movements relative to rod 28. Associated with pressure applying member 25 is a rod 32, spring 33 and disc 34 constructed and arranged like corresponding parts 28, 29 and 31 and operating to the same end and purpose, in this instance to effect an independent pressuring of member 25 toward the part 17.

On the exterior of the closed end of cage 12 is an anchor 35 to which one end of a tension spring is attached. The opposite end of spring 36 engages over a shaft 37 which rests in cut-out portions of a pair of ribs 38 and 39 upstanding from base plate 11. The spring 36 accordingly provides a force to urge cage 12 leftward as viewed in the drawings or in a separating relation with respect to cage 13. Also upstanding from base plate 11 is a pair of laterally spaced apart posts 41 and 42. Screw studs 43 and 44 are adjustably mounted in respective posts 41 and 42 and project toward the closed end of cage 12 in a manner to control or regulate the retracting motion of the cage permitted due to the influence of spring 36. The shaft 37 can be lifted out of the recesses in ribs 38-39 for easy disassembly of the fixture.

In the illustrated instance, cage 12 embraces a third rod 45 which positions alongside rods 28 and 32 and is similarly constructed and similarly is under control of a compression spring 36. Rod 45 acts, in a manner which will hereinafter more clearly appear upon an in-out fitting associated with the heat exchanger. All three rods 28, 32 and 45 extend through a vertical support 47 which extends transversely of the cage interior intermediately of open and closed ends thereof. Support 47 is fixed in place by screws 48 and has apertures which allow the several rods to pass therethrough but which do not accomodate the several spring engaged discs on the rods. Accordingly, in addition to providing an intermediate support for the cage, the support 47 limits extension of the rods 28, 32 and 45 under pressure of their respective springs.

The heat exchanger 14 has a rectangular configuration made up in part by longitudinally spaced apart header plates 49 and 51. Completing a rectangular enclosure are side plates 52 and 53 which extend between and interconnect end margins of the header plates. What may be regarded as upper edges of the side plates 52 and 53 are bent outward to define respective mounting flanges 54 and 55. Mounted to what may be regarded as an outer face or wall of header plate 49 are manifold members 56 and in-out fitting 58. Similarly, like manifold members 59 and 61 and an in-out fitting 62 are mounted to the outer face or wall of header plate 51. Within the defined enclosure are laterally spaced apart tubes 63 and fin material 64, the fin having a secondary heat transfer function. Vertically elongated tube members 63 are made in any convenient manner, as by rolling over the edges of adjacent sheet material upon one another and brazing the formed joints. As indicated in FIGS. 6 and 7, the tube interiors may be occupied by other fin material 66 having a function like that of fin material 64, of providing secondary heat transfer surface. The locations of tubes 63 are defined by correspondingly configured apertures 67 (FIG. 7) in the header plates. Tube ends are received in and extend through respective header apertures, and, beyond the header, have their extremities swaged or turned over to define flanges 68. In a lateral sense, apertures 67 are slightly oversize relative to the width of tubes 63. The fin material 64 is in the form of individual corrugated strips and in plural form or as single strips is caused to occupy the space between adjacent tubes or between side closures 52-53 and adjacent tubes. The fin strips have a length to terminate short of contact with header plates 49 and 51, with respect to which they define gaps 69 and 71. In height, the fins are dimensioned to contact adjacent tube surfaces, and, as will be better understood in the descriptions to follow, have a pressured engagement with tube surfaces during the brazing cycle. The length of side closure plates 52-53 substantially equals the spacing of header plates 49 and 51 and opposite ends of the side closures abut respective ends of the header plates, defining joints therewith.

The manifold members 56-57 and 59-61 are concavoconvex in shape and have their concave sides facing respective header plates in position to bridge adjacent tubes 63 and forming with respective header plates turn-a-round chambers 73. Manifold members at opposite ends of the heat exchanger are offset from one another and the in-out fittings 58 and 62 which have through openings 60 therein align with end ones of the lateral series of tubes 63. As is evident, a fluid entering fitting 58, for example, is directed to manifold 59, back across the heat exchanger to mainfold 56 and so on circuitously through sucessive tubes until it reaches and discharges from fitting 62. At the same time, another fluid, either environmentally or under forced flow, is in contact with tube exteriors and with extended surface fin material 64. A transfer of heat, from the fluid of higher temperture to the fluid of lower temperature occurs.

The manifold members 56, 57, 59 and 61 each have a generally rectangular configuration, corresponding approximately to that of pressure applying members 24. At each manifold perimeter is a flange 74 which on the concave side of the manifold is adapted for flush contact with the outer face or wall of a respective header plate. On the opposite side of the manifold, the convex surface terminates at the flange 74 which appears as a continuous, peripheral projection. In-out fittings 58 and 62 have their one ends seating flushly to respective header plates to communicate the through passages 60 therein with single aligning tube ends.

In preparing a heat exchanger for brazing, all parts are brought to an assembled relation, substantially as shown in FIG. 5, and, where necessary, are subjected to a temporary attachment procedure. Where joints are to be sealed or bonded, or both, a braze alloy is introduced and this may be in the form of a cladding or as an applied foil, powder or the like. Tube ends, after being inserted through the header plates are expanded to form the flanges 68. The assembled heat exchanger is placed on the base plate 11, or, more particularly, on raised ribs 76 (FIG. 4) effectively interconnecting vertical posts 16. In the ribs 76 are grooves 77 having a locating function in connection with the bottoms of tubes 63. Where ribs 76 join parts 16 are undercut portions 78 each adapted to receive the lower edge of a non-brazing pressure plate 79. Plates 79 are applied in conjunction with mounting of the heat exchanger on ribs 76 and are directly acted on by screws 15, transmitting the applied pressure to side closures 52-53 and through these to the interior tube and fin structure. The latter presents a substantially continuous transverse structure in which the applied pressure from opposite sides insures good, intimate contact of the fin material 64 with the tubes 63 and of good contact of the side closures 52-53 with header plates 49 and 51, particularly in conjunction with expansion forces generated by heat in the brazing cycle. Accordingly, upon installation of the pressure plates 79 and tightening up of the screws 15, the heat exchanger is locked up in a lateral or transverse sense for effective brazing.

In preparing the heat exchanger for pressuring in longitudinal senses, a part 17 is dropped into the spaces 69 and 71 at opposite ends of the heat exchanger, the presence of the tubes being accomodated by part slots 21. Flange 19 may limit against upper longitudinal edges of the tubes. The parts 17 accordingly provide what is in effect a plurality of separated dependent fingers inwardly of and in adjacent relation to header plates 49 and 51 in position to apply a uniformly distributed outwardly directed pressure thereto. Cage members 12 and 13 are then applied to opposite ends of the heat exchanger, this motion being continued until the open ends of the cage members achieve an overlying-underlying relation to respective parts 17. More particularly, the relative motion of the heat exchanger and cage members is continued until pairs of aligning holes 81 and 82 in each cage member register with through vertical passages 22 and 23 in the respective parts 17. When this occurs, headed pins 83 and 84 are inserted in the aligning sets of holes and passages, locking the cage members to opposite ends of the heat exchanger. In moving cage members 12 and 13 as described, the pressure applying members 24 and 25 are brought to bear against flange portions 74 of respective manifold members 56-57 and 59 and 61, and rods 45 are brought to bear against respective in-out fittings 58 and 62. As telescoping movement of the cage members continues, and holes 81-82 are brought to alignment with passages 22-23, the several springs 29, 33 and 36 of each cage member are compressed. The energy so stored in the deflected springs is applied on the one hand to a pressuring of manifold members and in-out fittings against the outer face of header plates 49 and 51, and, on the other hand, to a drawing of parts 17 outwardly against the inner face of the header plates. With respect to the manifold members, in-out fittings, and header plates, therefore, pressure applying members 24-25, rods 45 and parts 17 act as a clamp, insuring a close intimate contact of manifold members and fittings with respective header plates. Parts 17 may be regarded as serving, in this sense, as a reactant means, providing a stable resistance to dynamic pressures applied by the members 24-25 and rods 45. It is to be noted in this connection that the parts 17 are in a full, backing relation to the header plates, supporting them throughout against the pressures applied by the manifold members and fittings.

Cage members 12 and 13, and gripped header plates 49 and 51, are at this time still movable in a longitudinal sense relative to heat exchanger tubes 63. To control this motion, tension springs 36 are attached, at their one ends to anchors 35 and, at their other ends, are hooked over respective held shafts 37. The springs are stressed thereby and urge the cage members in a separating relation, bringing the header plates out into close, intimate contact with tube ends 68. The parts 17 have in this sense a dynamic function, executing retaining and pulling forces upon the header plates.

While the heat exchanger is held and pressured in the described manner, the entire assembly including fixture and heat exchanger is subjected to a brazing operation. This may be done, for example, by placing the fixture and heat exchanger assembly in a furnace where the temperature is raised to, maintained for a predetermined interval, and then allowed to cool from, a value sufficiently high as to cause melting and flowing of the braze material but not so high as to cause melting of parent material of heat exchanger parts themselves. At the conclusion of what may be termed a brazing cycle, the fixture is removed from the furnace, springs 36 unhooked from shafts 37, pins 81 and 82 withdrawn and screws 15 loosened. The heat exchanger is thus released from the fixture, and, upon removal of parts 17, the numerous elements comprising the heat exchanger will be found to be effectively joined in a one piece, unitary structure. Braze material will have flowed to and filled all joints, forming both a seal and a bond. In the brazing process, as the furnace temperature rises, heat exchanger parts and fixture parts expand or grow, the expansion rates being different since the heat exchanger will ordinarily be constructed of a material different from that of the relatively heavy steel parts of the fixture. For example, a heat exchanger of the kind to which the present invention is applicable will frequently be made of a light-weight aluminum alloy. Differential expansion is accomodated within the fixture by the applied spring pressures and is controlled by provided stops, the fixture design making use of differential thermal expansion to hold detail parts of the heat exchanger in place throughout the brazing cycle. Screws 15 may, in this connection, be regarded as adjustable stops which, in combination with thermal expansion of the tubes and fin material apply a pressure insuring good contact between the tubes and the fin material positioning therebetween.

The invention has been disclosed with respect to one illustrated embodiment, and certain modifications in such embodiment have been mentioned. It will be understood that these and other modifications within the scope of persons skilled in the art are within the intent and comprehension of the invention.

What is claimed is:

1. A method of making a heat exchanger comprised of longitudinally spaced apart tube connected header plates and fin material positioning between the tubes intermediately of the header plates, the header plates having apertures through which the tube ends project to terminate adjacent to respective outer header walls, including the steps of outwardly flaring tube end extremities, applying manifold members to said outer header walls to intercommunicate at least certain tube ends, in a holding fixture applying simultaneous continuous pressures firstly to urge a separating motion of said header plates outward into contact with respective outwardly flared tube extremities, secondly to urge said manifold members into contact with respective outer header walls, and thirdly to urge said fin material into contact with adjacent tube exteriors, and while parts are so held and pressured subjecting them to a brazing operation joining tube ends and manifold members to header plates and joining fin material to tube exteriors.

2. A method according to claim 1, fin material being provided between adjacent tubes and having a length so that the ends thereof do not reach engagement with inner header walls, and said method including the insertion into gaps between header walls and the ends of provided fin material of a dual purpose part acting in one sense as a portion of a means to urge a separating motion of the header plates.

3. A method according to claim 2, said part acting in another sense as a portion of a means to urge said manifold members into contact with respect outer header walls.

4. A method according to claim 1, wherein the holding fixture comprises spaced apart cage members between which the heat exchanger is mounted and means to urge the cage members in a separating relation, each cage member including floating means to urge the manifold members against the outer header wall, and the said second applied pressure being applied by means based on a respective cage member and acting on said floating means, and the application of said first and second pressures including the steps of inserting between header plates and contained fin material dual purpose parts acting as reactant means in conjunction with the pressuring of said floating means to insure a seating of said manifold members to said header plates without moving said plates longitudinally of said tubes and acting as a dynamic means in conjunction with the biasing apart of said cage members to seat said header plates to flared out tube ends.

* * * * *